Patented Mar. 19, 1929.

1,705,974

UNITED STATES PATENT OFFICE.

WILHELM HERZBERG, OF BERLIN-WILMERSDORF, AND HEINRICH OHLENDORF, OF BERLIN-FRIEDENAU, GERMANY, ASSIGNORS, BY MESNE ASSIGNMENTS, TO GRASSELLI DYESTUFF CORPORATION, OF NEW YORK, N. Y., A CORPORATION OF DELAWARE.

AZO DYES FROM HYDROXY-NAPHTHO-DIAZINE DERIVATIVES.

No Drawing. Application filed October 4, 1926, Serial No. 139,548, and in Germany June 9, 1925.

In German specification 394,195 there are described para-diazine derivatives which are obtained by alkaline fusion of para-diazine derivatives containing sulpho groups. The sulpho groups by this process successively are replaced by hydroxyl groups, the hydroxyl group in the 8-position of the conjugated naphthalene ring in the alkaline melt giving rise to a condensation reaction.

The present invention relates to new azo dyes derived from a diazo compound and a hydroxy-para-diazine derivative being a substitution product of a compound probably of the general formula:

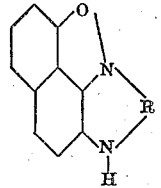

R being an aromatic radicle, this diazine oxide resulting by alkaline fusion of a substitution product of a compound probably corresponding to the general formula:

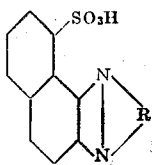

The new dyes are destroyed by strong reducing agents.

By treating only a small quantity of the dyes with a cold solution of stannous chloride in strong hydrochloric acid a bluish solution is formed, the coloration of which changing to yellowish brown after some time, especially on heating.

The following examples are given in order to illustrate the invention without limiting it, the parts being by weight:

*Example 1.*—The diazo compound from 173 parts of 1-aminobenzene-4-sulphonic acid is allowed to flow into a solution in 6000 parts of water and 40 parts of sodium hydroxide of 260 parts of the product probably corresponding to the formula:

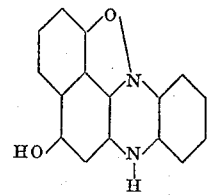

which may be obtained by melting with an alkali metal hydroxide 4.8-disulfo-1.2-naphtho-phenazine:

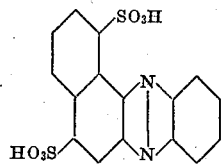

or 4-hydroxy-8-sulfo-1.2-naphtho-phenazine:

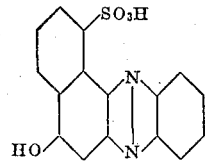

The 4.8-disulfo-1-naphtho-phenazine mentioned may be prepared from 1.2-naphthoquinone-4.8-disulfonic acid and 1.2-diaminobenzene; the 4-hydroxy-8-sulfo-1.2-naphthophenazine is obtainable from 4-hydroxy-1.2-naphthoquinone-8-sulfonic acid and 1.2-diamino-benzine. There are then added 110 parts of anhydrous sodium carbonate. In the course of several hours the coupling is complete. The dyestuff is salted out and worked up as usual. When dry it is a dark brown powder. On wool the dyestuff yields yellow tints of good fastness to fulling and excellent fastness to light.

The corresponding dyestuff from 1-amino-naphthalene-4-sulphonic acid dyes animal fibres red with a yellowish sheen. 4-amino-azo-benzene-4'-sulphonic acid yields a dyestuff which dyes animal and vegetable fibres red. If diazo compounds are used which are derived from aminoazo-dyestuffs, dyes are obtained which dye cotton in general red brown to blackish brown shades.

*Example 2.*—The solution of the sodium salt of the diazine compound used in Example 1 is coupled with the diazo compound from 4-amino-1-methylbenzene-3-sulphonic acid. The dye forms with metal salts lakes which are insoluble in water. The barium-, calcium- and particularly the copper lakes yield in painting or printing brown tints of excellent fastness to light and of good covering power.

By use of other suitable diazo sulphonic acids even a deeper brown may be obtained.

*Example 3.*—The diazo compound from 22.4 parts of 2-amino-4-chloro-1-hydroxybenzene-5-sulphonic acid is added to a solution of 26.2 parts of the diazine compound used in Example 1 in the equivalent proportion of sodium hydroxide solution and in the course of several hours a solution of 8 parts of sodium hydroxide in 50 parts of water is added drop by drop. When coupling is complete the dye may be salted out. It dyes wool orange brown. By after-chroming or dyeing in the presence of a chromium mordant a violet brown tint is obtained. The dyeings have excellent fastness to washing, fulling and sulphur and good fastness to steaming.

The dye probably corresponds to the formula:

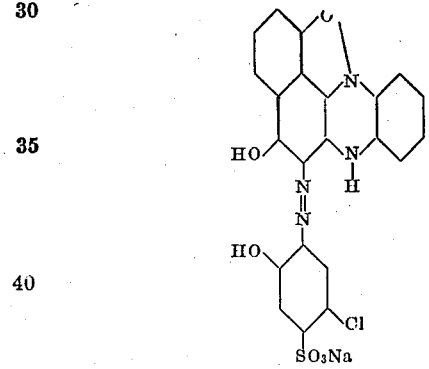

The diazo compound from 6-nitro-2-amino-1-hydroxybenzene-4-sulphonic acid yields a similar dye.

*Example 4.*—The diazo compound from 223 parts of 1-aminonaphthalene-4-sulphonic acid is caused to act on a solution of 312 parts of the compound obtainable by alkaline fusion of a 4-hydroxy-8-sulfodinaphthazine and probably corresponding to one of the following formulæ:

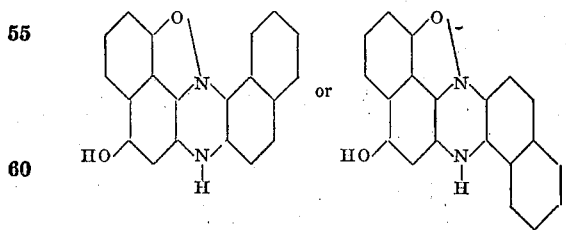

The dye, worked up in the usual manner, dyes wool fast red.

The corresponding dye from diazotized 1-aminobenzene-4-sulphonic acid dyes animal fibre fast orange.

*Example 5.*—The diazo compound from 300 parts of 4-aminoazobenzene-4'-sulphonic acid is introduced into a solution of 312 parts of the azine compound referred to in Example 4 and of the equivalent proportion of sodium hydroxide and 1000 parts of milk of lime (5-normal) are added. After 5 hours the dye is worked up in the usual manner; it dyes unmordanted cotton salmon red.

*Example 6.*—173 parts of 1-aminobenzene-4-sulphonic acid are diazotized and coupled with 230 parts of sodium-1-amino-naphthalene-6-sulphonate, dissolved in 2500 parts of water with addition of 100 parts of crystallized sodium acetate. After further diazotizing the product is coupled under the conditions given in Example 5 with the diazine-compound prescribed in Example 4. The dye dyes cotton red brown. It probably corresponds to the formula:

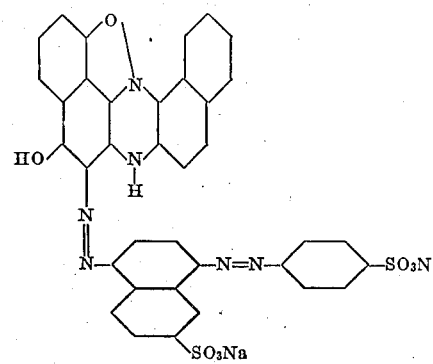

By coupling the hydroxydiazine compound used in the Example 4 with the equivalent proportion of 4-chloro-2-diazo-1-hydroxybenzene-5-sulphonic acid or by an analogous ortho-hydroxydiazo compound there are obtained mordant dyes of the character of that made in accordance with Example 3.

*Example 7.*—The diazine compound prescribed in Example 4 is coupled in alkaline solution with the equivalent proportion of 2-diazonaphthalene-1-sulphonic acid. The dye yields insoluble barium salts and calcium salts which are Bordeaux-red pigments suitable for oil paints and carpet printing. The excellent covering power and surprising fastness to light of these compounds are remarkable.

In a similar manner other hydroxy-paradiazine compounds of the mentioned general constitution may be used. For instance, the compound of the probable formula:

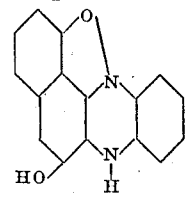

obtainable by alkaline fusion of 3.8-disulfo- 1.2-naphtho-phenazine yields with diazo-arylsulphonic acids fast brown to violet brown wool dyes. The compound obtainable by alkaline fusion of 6'.8-disulpho-1.2.1'.2'-dinaphthazine or 6'.8-disulpho-1.2.2'.1'-dinaphthazine and probably corresponding to the formula:

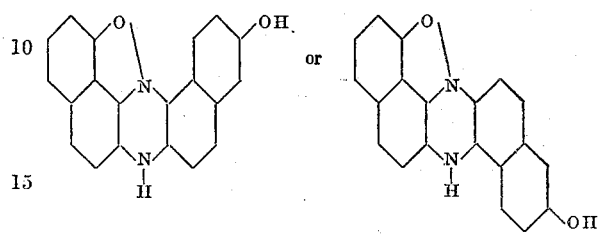

respectively gives by combining with diazobenzene sulphonic acids and also by combining with diazonaphthalene sulphonic acids dyes dyeing wool orange to violet brown.

What we claim is,—

1. As new products, the azo dyestuffs of the formula:

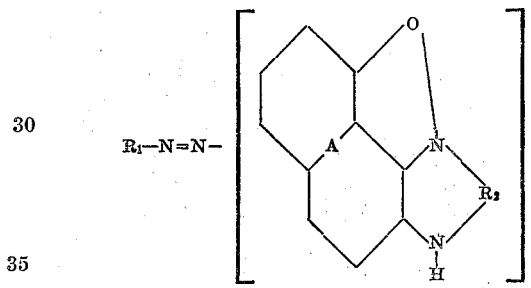

in which $R_1$ stands for a radicle of the group including the benzene and naphthalene series substituted by at least one sulfonic acid group, and $R_2$ for a radicle of the group including the benzene and naphthalene series, and the naphthalene nucleus A is substituted by at least one hydroxyl group, which dye animal and vegetable fibres generally yellow to brown to violet shades of excellent fastness to washing and to light.

2. As new products, the azo dyestuffs of the formula:

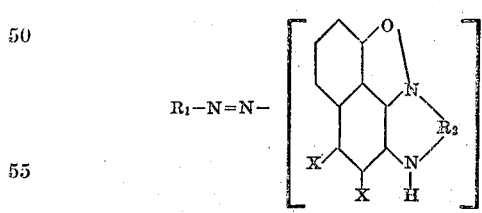

in which $R_1$ stands for a radicle of the group including the benzene and naphthalene series substituted by at least one sulfonic acid group $R_2$ for a radicle of the group including the benzene and naphthalene series, and one X stands for an hydroxyl group and the other X for hydrogen, which dye animal and vegetable fibres generally yellow to brown to violet shades of excellent fastness to washing and to light.

3. As new products, the azo dyestuffs of the formula:

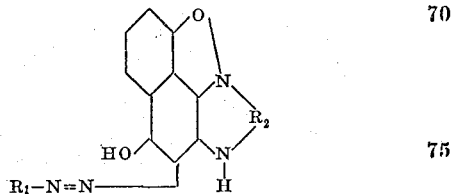

in which $R_1$ stands for a radicle of the group including the benzene and naphthalene series substituted by at least one sulfonic acid group, and $R_2$ stands for a radicle of the group including the benzene and naphthalene series, which dye animal and vegetable fibres generally yellow to brown to violet shades of excellent fastness to washing and to light.

4. As new products, the azo dyestuffs of the formula:

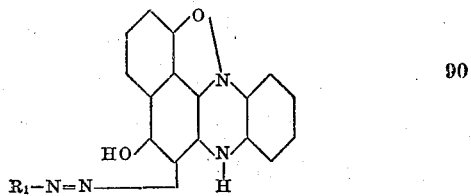

in which $R_1$ stands for a radicle of the group including the benzene and naphthalene series substituted by at least one sulfonic acid group, which dye animal and vegetable fibres generally yellow to brown to violet shades of excellent fastness to washing and to light.

5. As new products, the azo dyestuffs of the formula:

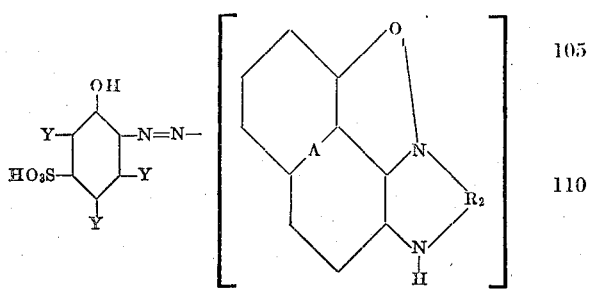

wherein one Y stands for a substituent of the group including chloro and nitro and the other Y's represent hydrogen, $R_2$ stands for a radicle of the group including the benzene and naphthalene series, and the naphthalene nucleus A is substituted by at least one hydroxyl group, which dye animal and vegetable fibers generally yellow to brown to violet shades of excellent fastness to washing and to light.

6. As new products, the azo dyestuffs of the formula:

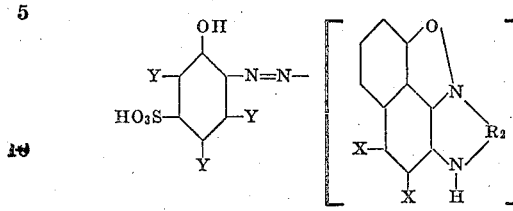

wherein one Y stands for a substituent of the group including chloro and nitro and the other Y's represent hydrogen, $R_2$ stands for a radicle of the group including the benzene and naphthalene series, and one X stands for an hydroxyl group and the other X for hydrogen, which dye animal and vegetable fibres generally yellow to brown to violet shades of excellent fastness to washing and to light.

7. As new products, the azo dyestuffs of the formula:

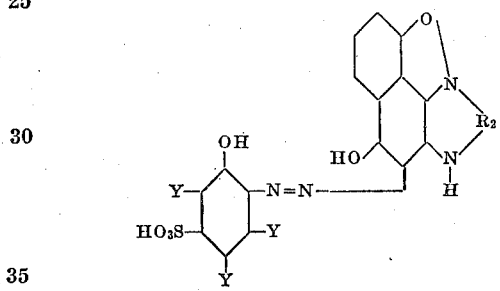

wherein one Y stands for a substituent of the group including chloro and nitro and the other Y's represent hydrogen, $R_2$ stands for a radicle of the group including the benzene and naphthalene series, which dye animal and vegetable fibres generally yellow to brown to violet shades of excellent fastness to washing and to light.

8. As new products, the azo dyestuffs of the formula:

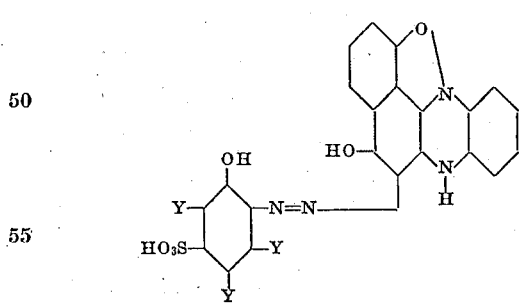

wherein one Y stands for a substituent of the group including chloro and nitro and the other Y's represent hydrogen, which dye animal and vegetable fibres generally yellow to brown to violet shades of excellent fastness to washing and to light.

9. As new products, the azo dyestuffs of the formula:

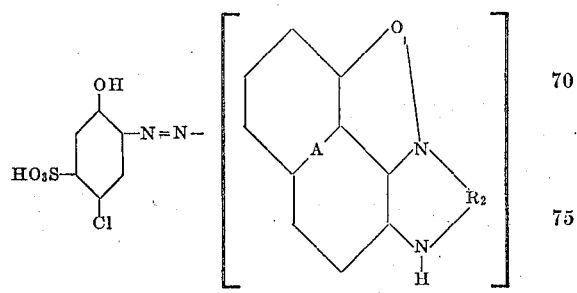

in which $R_2$ stands for a residue of the group including the benzene and naphthalene series, and the naphthalene nucleus A is substituted by at least one hydroxyl group, which dye animal and vegetable fibres generally yellow to brown to violet shades of excellent fastness to washing and to light.

10. As new products, the azo dyestuffs of the formula:

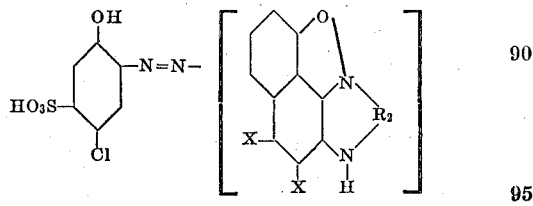

in which $R_2$ stands for a residue of the group including the benzene and naphthalene series, and one X stands for an hydroxyl group and the other X for hydrogen, which dye animal and vegetable fibres generally yellow to brown to violet shades of excellent fastness to washing and to light.

11. As new products, the azo dyestuffs of the formula:

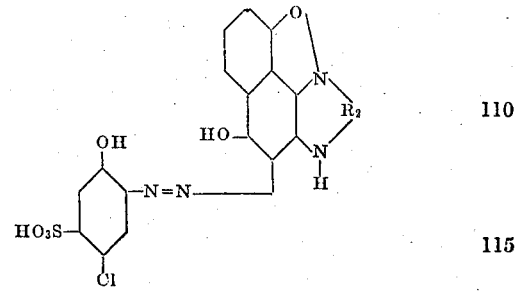

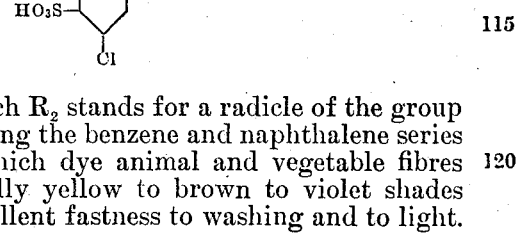

in which $R_2$ stands for a radicle of the group including the benzene and naphthalene series and which dye animal and vegetable fibres generally yellow to brown to violet shades of excellent fastness to washing and to light.

12. As a new product, the azo dyestuff of the formula:

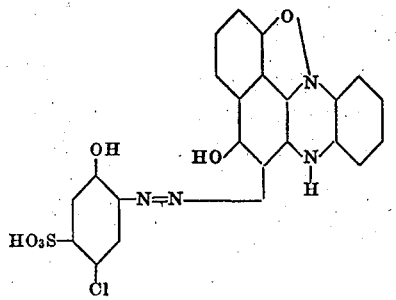

which dyes wool orange brown shades of excellent fastness to washing.

13. Materials dyed with the dyestuffs of claim 1.
14. Materials dyed with the dyestuffs of claim 2.
15. Materials dyed with the dyestuffs of claim 3.
16. Materials dyed with the dyestuffs of claim 4.
17. Materials dyed with the dyestuffs of claim 5.
18. Materials dyed with the dyestuffs of claim 6.
19. Materials dyed with the dyestuffs of claim 7.
20. Materials dyed with the dyestuffs of claim 8.
21. Materials dyed with the dyestuffs of claim 9.
22. Materials dyed with the dyestuffs of claim 10.
23. Materials dyed with the dyestuffs of claim 11.
24. Materials dyed with the dyestuffs of claim 12.

In testimony whereof we affix our signatures.

WILHELM HERZBERG.
HEINRICH OHLENDORF.